US008001258B2

(12) United States Patent  (10) Patent No.: US 8,001,258 B2
Cardno et al.  (45) Date of Patent: *Aug. 16, 2011

(54) DATA TRANSFER SYSTEM AND METHOD

(75) Inventors: Andrew John Cardno, Henderson, NV (US); Simon Travers-Jones, Wellington (NZ)

(73) Assignee: Bally Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 12/871,203

(22) Filed: Aug. 30, 2010

(65) Prior Publication Data

US 2011/0016230 A1  Jan. 20, 2011

Related U.S. Application Data

(63) Continuation of application No. 10/367,643, filed on Feb. 14, 2003, now Pat. No. 7,788,390.

(30) Foreign Application Priority Data

Aug. 17, 2000 (NZ) .................................. 506411
Aug. 10, 2001 (NZ) ...................... PCT/NZ01/00162

(51) Int. Cl.
  *G06F 15/16* (2006.01)
(52) U.S. Cl. .......... 709/230; 370/260; 370/466; 725/86; 725/110
(58) Field of Classification Search .................. 370/310, 370/465, 401, 466, 395.53, 260, 352; 709/204, 709/227, 203, 228, 237; 725/86, 110; 379/219; 348/14.08
See application file for complete search history.

(56) References Cited

U.S. PATENT DOCUMENTS

| 5,724,355 | A | * | 3/1998 | Bruno et al. ................... 370/401 |
| 5,732,216 | A | * | 3/1998 | Logan et al. ................... 709/203 |
| 5,790,792 | A |   | 8/1998 | Dudgeon et al. |
| 5,911,776 | A |   | 6/1999 | Guck |
| 5,991,800 | A | * | 11/1999 | Burke et al. ................... 725/110 |
| 6,049,531 | A | * | 4/2000 | Roy .......................... 370/395.53 |
| 6,078,350 | A | * | 6/2000 | Davis ......................... 348/14.08 |
| 6,105,068 | A | * | 8/2000 | Naudus ........................ 709/228 |
| 6,185,288 | B1 | * | 2/2001 | Wong ............................ 379/219 |
| 6,195,358 | B1 | * | 2/2001 | Bowater et al. ............... 370/401 |
| 6,262,978 | B1 | * | 7/2001 | Bruno et al. .................. 370/260 |
| 6,278,697 | B1 | * | 8/2001 | Brody et al. .................. 370/310 |

(Continued)

FOREIGN PATENT DOCUMENTS

EP  0771095 A2  5/1997

*Primary Examiner* — Dustin Nguyen
(74) *Attorney, Agent, or Firm* — Steptoe & Johnson LLP

(57) ABSTRACT

A method is disclosed of data transfer between a source computer and multiple target computers. The method includes: transmitting a multi-media formatted transmission from the source computer over a first network to a server configured to receive the multi-media formatted transmission in more than one protocol; converting the multi-media formatted transmission into a data stream in an Internet format by extracting the data stream from the multi-media formatted transmission; transmitting the data stream in the Internet format over a second network to the target computers, the target computers each configured to receive the data stream in a finite set of protocols over the second network, the finite set of protocols including Internet protocols but excluding multi-media protocols; and extracting data from the data stream and reformatting the extracted data into a multi-media format at each target computer, wherein each target computer is able to reformat the extracted data into different multi-media formats, since the reformatting is occurring at each target computer individually.

8 Claims, 3 Drawing Sheets

U.S. PATENT DOCUMENTS

| | | | |
|---|---|---|---|
| 6,360,265 B1 * | 3/2002 | Falck et al. | 709/227 |
| 6,385,193 B1 * | 5/2002 | Civanlar et al. | 370/352 |
| 6,408,436 B1 * | 6/2002 | de Haas | 725/86 |
| 6,466,585 B1 * | 10/2002 | Le | 370/465 |
| 6,470,020 B1 * | 10/2002 | Barker et al. | 370/401 |
| 6,594,276 B1 * | 7/2003 | Le | 370/465 |
| 6,711,166 B1 * | 3/2004 | Amir et al. | 370/395.1 |
| 6,801,540 B1 * | 10/2004 | Jeong | 370/466 |
| 6,965,614 B1 * | 11/2005 | Osterhout et al. | 370/466 |
| 7,039,675 B1 * | 5/2006 | Kato | 709/204 |
| 7,698,365 B2 * | 4/2010 | Van Buskirk et al. | 709/204 |
| 2001/0052023 A1 * | 12/2001 | Lin et al. | 709/237 |

* cited by examiner

DATA TRANSFER SYSTEM AND METHOD

CROSS REFERENCE TO RELATED APPLICATIONS

This utility application is a continuation application and claims priority to U.S. patent application Ser. No. 10/367,643, filed on Feb. 14, 2003, now U.S. Pat. No. 7,788,390, which is a continuation application of the PCT International Patent Application, serial number PCT/NZ01/00162, filed on Aug. 10, 2001, which claims priority to New Zealand Patent Application, serial number NZ 506411, filed on Aug. 17, 2000, the subject matter of which are incorporated herewith by reference.

FIELD

The invention relates to a data transfer system and method.

BACKGROUND

It is becoming increasingly common to use a firewall where client workstations in an organization are connected to the Internet. Firewalls generally operate by shielding an organization's network from certain data transmissions which have the potential to be harmful or disruptive to the organization's activities.

Most fire walls achieve this task by accepting data in one of a finite set of protocols and rejecting data in any other protocol. It would be very useful for an organization to expand the number of allowable protocols within an organization network without compromising the safety or performance of that organization's network.

SUMMARY

Briefly, and in general terms, a method is disclosed of data transfer between a source computer and multiple target computers. The method includes: transmitting a multi-media formatted transmission from the source computer over a first network to a server configured to receive the multi-media formatted transmission in more than one protocol; converting the multi-media formatted transmission into a data stream in an Internet format by extracting the data stream from the multi-media formatted transmission; transmitting the data stream in the Internet format over a second network to the target computers, the target computers each configured to receive the data stream in a finite set of protocols over the second network, the finite set of protocols including Internet protocols but excluding multi-media protocols; and extracting data from the data stream and reformatting the extracted data into a multi-media format at each target computer, wherein each target computer is able to reformat the extracted data into different multi-media formats, since the reformatting is occurring at each target computer individually.

In another embodiment, a data transfer system is disclosed that includes a server connected to a first network, a streaming converter, multiple target computers connected to a second network, and a client converter. The server is configured to receive a multi-media formatted transmission in a first protocol from a source computer. The streaming converter is configured to extract a data stream from the multi-media formatted transmission to enable the data stream to be sent in an Internet format. The target computers are configured to receive the data stream in a finite set of protocols over the second network. The finite set of protocols includes Internet protocols, but excluding multi-media protocols. The client converter is installed on the target computers and enables extraction of data from the data stream in the second protocol to be reformatted into different multi-media formats at each target computer. Each target computer is able to reformat the extracted data into different multi-media formats, since the reformatting is occurring at each target computer individually.

BRIEF DESCRIPTION OF THE FIGURES

Preferred forms of the data transfer system and method will now be described with reference to the accompanying figures in which.

DETAILED DESCRIPTION OF THE PREFERRED EMBODIMENTS

Figure 1:
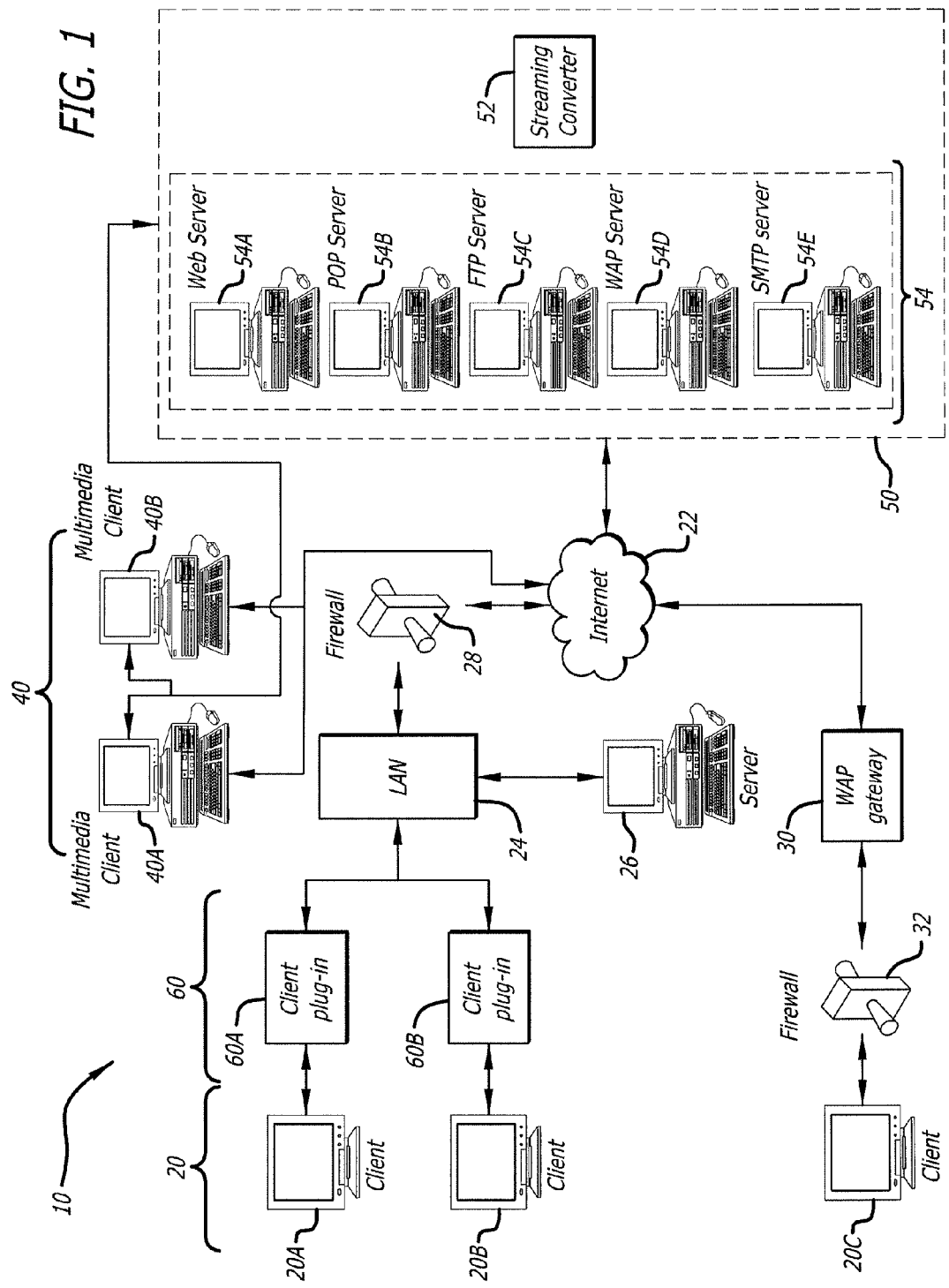
FIG. 1 shows a block diagram of an Internet-based system in which the invention may be implemented.

FIG. 1 illustrates a block diagram of the preferred Internet-based system 10 in which the present invention may be implemented. The system includes one or more clients 20, for example clients 20A, 20B and 20C, which may each comprise a personal computer or workstation operating under the control of suitable software which will be described below. Each client 20 is interfaced to the Internet 22. Each client 20 could be connected directly to the Internet with a suitable dial-up connection or could be connected through a local area network or LAN. Clients 20A and 20B are connected to a network 24, such as a local area network or LAN. The network 24 could be connected to a suitable network server 26 and communicate with the Internet 22 as shown.

The LAN 24 could be interfaced to the Internet 22 through a suitable fire wall 28. The preferred fire wall 28 provides data transfer for data in a format compatible with an Internet protocol such as hyper text transfer protocol (HTTP), file transfer protocol (FTP), simple mail text protocol (SMTP) or post office protocol (POP). Fire wall 28 is generally arranged to prevent data transfer of data in protocol formats other than HTTP, FTP, SMTP or POP.

Client 20C, for example, could be connected to the Internet 22 with a dial up connection or wireless application protocol (WAP) connection. Client 20C could be connected to a suitable WAP gateway 30 and fire wall 32 arranged to transfer data in a wireless application protocol (WAP) between client 20C and Internet 22, and to reject or block data in any other protocol.

The system 10 also includes one or more multi-media clients 40, for example multi-media client 40A and 40B. Each multi-media client 40 is connected to the Internet 22 as shown in FIG. 1. Each multi-media client 40 preferably comprises a personal computer or workstation operating under the control of suitable software. Each multimedia client 40 is arranged to transmit and receive data in one or more multi-media protocols other than HTTP, FTP, SMTP or POP suitable for the transfer of data, audio and data, audio and video, or a combination of audio, video and data. These multi-media protocols could include T.120, or H.323 for example. It is envisaged that the multi-media protocols could also include extensions of these protocols or could include other protocols which are based on these protocols, for example G.711, G.722, and G.728, which are all based on protocol H.320.

The system further comprises a server 50 which is configured to transmit data to clients 20 in one of a number of Internet protocols, for example HTTP, FTP, SMTP, POP or WAP as described above. The server 50 is similarly arranged to receive data including data requests and format requests from the client 20 in one of the Internet protocols. The server 50 is further arranged to receive data in one or more multi-media protocols from multi-media clients 40 and to transmit data, for example user requests, to the multi-media clients in a suitable multi-media format.

The server 50 is preferably arranged to receive the multi-media transmissions from multi-media clients 40 and to convert the data to a suitable Internet protocol for transmission to client 20. In this way the server receives a multi-media transmission from a source computer in the ford of a multi-media client 40 over a first network, for example the Internet 22. The data is converted to a suitable Internet protocol ready for transmission to a target computer in the form of client 20 over a second network, for example LAN 24. The invention is also preferably arranged to convert the user requests in an Internet protocol format from client 20 to a multi-media format for transmission to a multi-media client 40.

As shown in FIG. 1, the server 50 preferably includes a streaming converter 52 and either includes or at least functions as one or more format servers 54, for example HTTP or web server 54A, POP server 54B, FTP server 54C, WAP server 54D and/or SMTP server 54E.

As described above, a user request is transmitted from client 20 through firewall 28 or 32 over the Internet 22 to the server 50. Each user request includes a format request which specifies the data format required by the user, called the user format. This user format could include HTTP, HP, SMTP, POP and WAP. The user request is directed to the appropriate server 54 to process the request and the user request is then passed to streaming converter 52.

The streaming converter 52 which in one form could comprise a software module installed and operating on the server 50, translates the user request in an Internet protocol format to a multi-media format for transmitting to multi-media client 40. The user request is then processed by multi-media client 40 and the requested data is transmitted to the server 50.

The streaming converter 52 receives the transmitted data from each multi-media client 40 in a multi-media format. The streaming converter 52 extracts the data from the multi-media transmission and transfers the data to the appropriate server 54 as specified in the user format request. The data stream is reformatted to the required user format by the appropriate web server 54 and transmitted over the Internet, through firewall 28 or 32 to user client 20.

As shown in FIG. 1, client 20 could be provided with a client converter which in one form could comprise a client software plug-in 60, for example 60A or 60B. The client plug-in 60 extracts the data from the Internet transmission and reformats the extracted data stream into an appropriate multi-media format.

Figure 2:
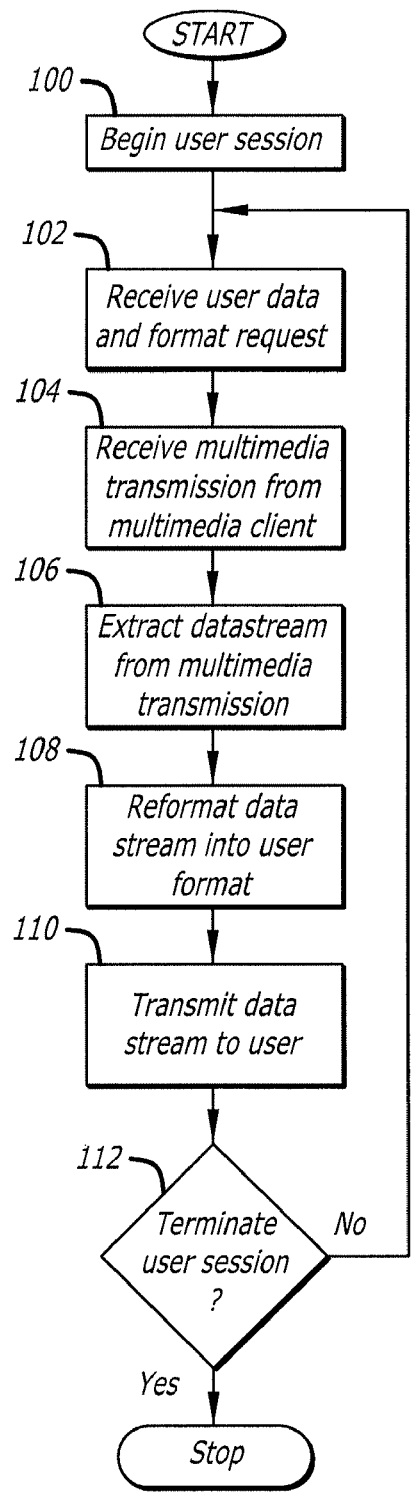
FIG. 2 shows a flow chart of processing performed by one preferred form of the invention.

FIG. 2 illustrates the processing performed by a preferred form of the server 50. As indicated at 100, a user commences a user session on a client 20. In one preferred form of the invention, the server 50 could be provided as a website having a series of links to multi-media clients 40, for example web-enabled radio stations. A user could initiate a user session by accessing such a website. It is envisaged that the user may be provided with appropriate authentication software.

The server 50 as shown at 102 receives a series of user data requests and user format requests. These requests typically specify the multi-media client from which the data is to be retrieved and the format of the data required by the user.

As shown at 104, the server 50 transmits the user request to a multi-media client and receives the resulting multi-media transmission from the multi-media client. The multi-media transmission is typically in a multi-media format and as shown at 106, the invention extracts a data stream from this multi-media transmission. The data stream is then reformatted into a user format, as indicated at 108, and then the reformatted data stream is transmitted to a user, as indicated at 110, as an Internet transmission.

As shown at 112, the server 50 continues to receive user data and format requests until the user session has been terminated. The user session could be terminated, for example, by a user closing the web browsing program used to access the invention or by logging out of a user-authorized connection.

Figure 3:
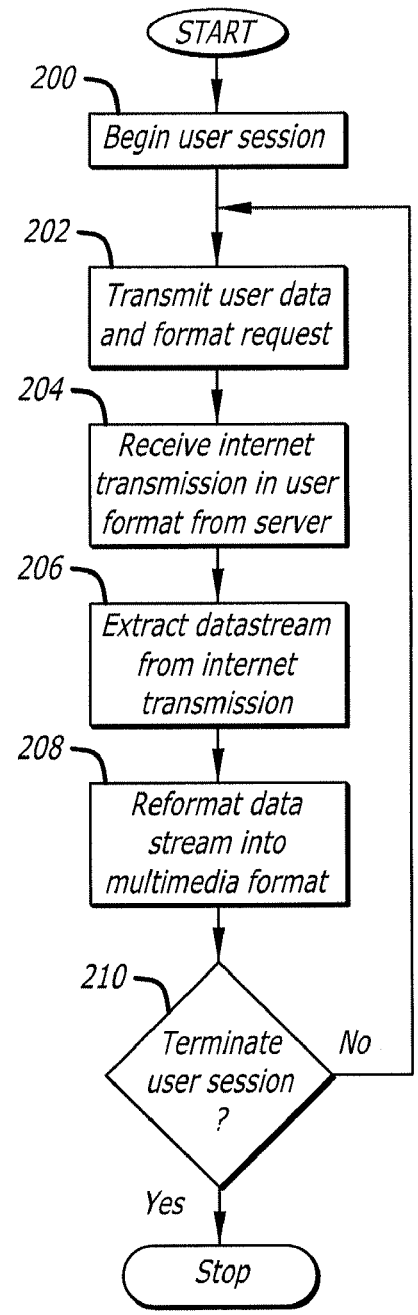
FIG. 3 shows a flow chart of processing performed by a user client when used with the invention.

FIG. 3 illustrates the preferred processing performed on client 20. As shown at 200, the user commences a user session, for example by accessing a website provided by the server 50. As described above, the client 20 could be provided with appropriate user authentication.

As shown at 202, the client 20 transmits user data requests and format requests in an Internet protocol format to the server 50 through firewall 28 or 32 and Internet 22. The server 50 transmits data in an Internet transmission format and referring to 204, the client 20 receives the Internet transmission in a user format from the server.

As shown at 206, the client 20 extracts the data stream from the Internet transmission and as shown at 208, reformats the data stream into a multi-media format. It will be appreciated that steps 206 and 208 could be performed by a client software plug-in 60.

As shown at 210, the client 20 continues to transmit user data and format requests to the server until the user session is terminated, for example by closing the current web browsing program or by logging out of a user-authorized connection.

Figure 4:
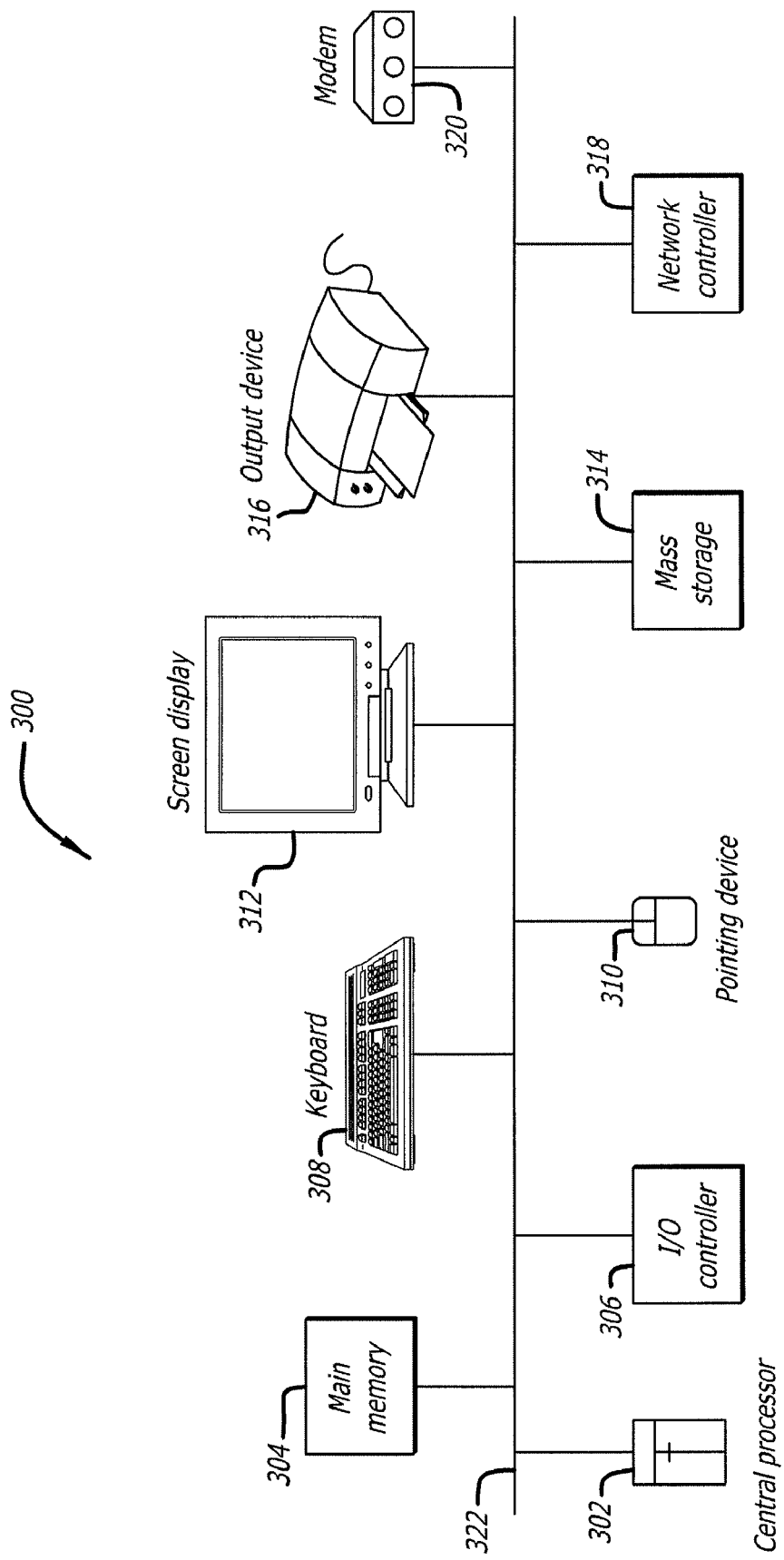
FIG. 4 shows the preferred system architecture on which the present invention may be implemented.

FIG. 4 shows the preferred system architecture of a client 20, server 54, the streaming converter 52 and/or multi-media client 40. The computer system 300 typically comprises a central processor 302, a main memory 304, an input/output controller 306, a keyboard 308, a pointing device 310, for example a mouse, a display or screen device 312, a mass storage 314, for example a hard disk, floppy disk or optical disc, and an output device 316, for example a printer. The computer system 300 could also include a network interface card or controller 318 and/or a modem 320. The individual components of system 300 could communicate through a system bus 322.

The invention enables an organization to expand the number of protocols acceptable to an organization, for example by permitting users to enjoy the benefits of multi-media protocols, without comprising the safety or performance of the organization's network. The invention enables an organization to use a conventional firewall product thereby saving the organization the cost of developing a specific firewall, or modifying an existing firewall.

The foregoing describes the invention including preferred forms thereof. Alterations and modifications as will be obvious to those skilled in the art are intended to be incorporated within the scope hereof, as defined by the accompanying claims.

What is claimed:

1. A method of data transfer between a source computer and multiple target computers, comprising:

transmitting a multi-media formatted transmission from the source computer over a first network to a server configured to receive the multi-media formatted transmission in more than one protocol;

converting the multi-media formatted transmission into a data stream in an Internet format by extracting the data stream from the multi-media formatted transmission;

transmitting the data stream in the Internet format over a second network to the target computers, the target computers each configured to receive the data stream in a finite set of protocols over the second network, the finite set of protocols including Internet protocols but excluding multi-media protocols; and extracting data from the data stream and reformatting the extracted data into a multi-media format at each target computer, wherein each target computer is able to reformat the extracted data into different multi-media formats, since the reformatting is occurring at each target computer individually.

2. The method of claim 1, wherein the Internet format is selected from the group comprising HTTP, FTP, SMTP and POP.

3. The method of claim 1, wherein the multi-media formatted transmission is selected from the group comprising audio-visual and audio formats.

4. A data transfer system comprising:

a server connected to a first network, the server configured to receive a multi-media formatted transmission in a first protocol from a source computer;

a streaming converter configured to extract a data stream from the multi-media formatted transmission to enable the data stream to be sent in an Internet format;

multiple target computers connected to a second network, the target computers configured to receive the data stream in a finite set of protocols over the second network, the finite set of protocols including Internet protocols but excluding multi-media protocols;

a client converter installed on the target computers enabling extraction of data from the data stream in the second protocol to be reformatted into different multi-media formats at each target computer, wherein each target computer is able to reformat the extracted data into different multi-media formats, since the reformatting is occurring at each target computer individually.

5. A data transfer system as claimed in claim 4, wherein the Internet format is selected from the group comprising HTTP, FTP, SMTP and POP.

6. A data transfer system as claimed in claim 4, wherein the multi-media formatted transmission is selected from the group comprising audio-visual and audio formats.

7. A data transfer system as claimed in claim 4, wherein the server includes a processor.

8. A data transfer system as claimed in claim 4, wherein the target computers each include a processor.

* * * * *